(12) United States Patent
Di Loreto et al.

(10) Patent No.: US 9,776,923 B2
(45) Date of Patent: Oct. 3, 2017

(54) SILICEOUS COMPOSITION AND METHOD FOR OBTAINING SAME

(71) Applicant: FIB-SERVICES INTELLECTUAL S.A., Windhof (LU)

(72) Inventors: Osvaldo Di Loreto, Boussu (BE); Jacques Tirlocq, Baudour (BE)

(73) Assignee: FIB-SERVICES INTELLECTUAL S.A., Windhof (LU)

( * ) Notice: Subject to any disclaimer, the term of this patent is extended or adjusted under 35 U.S.C. 154(b) by 0 days.

(21) Appl. No.: 15/104,516

(22) PCT Filed: Dec. 10, 2014

(86) PCT No.: PCT/EP2014/077135
§ 371 (c)(1),
(2) Date: Jun. 14, 2016

(87) PCT Pub. No.: WO2015/091129
PCT Pub. Date: Jun. 25, 2015

(65) Prior Publication Data
US 2016/0318805 A1 Nov. 3, 2016

(30) Foreign Application Priority Data

Dec. 19, 2013 (LU) .......................... 92339

(51) Int. Cl.
C04B 35/14 (2006.01)
F27D 1/16 (2006.01)
C04B 35/65 (2006.01)
C04B 35/66 (2006.01)
C04B 35/64 (2006.01)
C01B 33/12 (2006.01)

(52) U.S. Cl.
CPC .............. *C04B 35/14* (2013.01); *C04B 35/64* (2013.01); *C04B 35/65* (2013.01); *C04B 35/651* (2013.01); *C04B 35/66* (2013.01); *F27D 1/16* (2013.01); *F27D 1/1636* (2013.01); *C01B 33/12* (2013.01); *C04B 2235/321* (2013.01); *C04B 2235/3206* (2013.01); *C04B 2235/3208* (2013.01); *C04B 2235/3418* (2013.01); *C04B 2235/428* (2013.01); *C04B 2235/5427* (2013.01); *C04B 2235/5463* (2013.01); *C04B 2235/656* (2013.01); *C04B 2235/72* (2013.01); *C04B 2235/77* (2013.01); *C04B 2235/80* (2013.01); *C04B 2235/94* (2013.01); *C04B 2235/95* (2013.01); *C04B 2235/96* (2013.01); *C04B 2235/9669* (2013.01)

(58) Field of Classification Search
CPC .............................. C04B 35/14; C03B 20/00
See application file for complete search history.

(56) References Cited

U.S. PATENT DOCUMENTS

| | | | |
|---|---|---|---|
| 2,599,236 A | 6/1952 | Cramer et al. | |
| 4,792,468 A * | 12/1988 | Robyn | C04B 35/6303 264/30 |
| 4,920,084 A * | 4/1990 | Robyn | C04B 35/6303 501/100 |
| 4,946,806 A * | 8/1990 | Willard | B05B 7/205 501/108 |
| 5,780,114 A | 7/1998 | Meynckens et al. | |

FOREIGN PATENT DOCUMENTS

| | | |
|---|---|---|
| GB | 1 225 629 A | 3/1971 |
| GB | 2 170 191 A | 7/1986 |
| WO | 92/19566 A1 | 11/1992 |

OTHER PUBLICATIONS

International Search Report dated Mar. 4, 2015, issued in corresponding International Application No. PCT/EP2014/077135, filed Dec. 10, 2014, 9 pages.
Written Opinion dated Mar. 4, 2015, issued in corresponding International Application No. PCT/EP2014/077135, filed Dec. 10, 2014, 12 pages.

* cited by examiner

*Primary Examiner* — Karl Group
(74) *Attorney, Agent, or Firm* — Christensen O'Connor Johnson Kindness PLLC

(57) ABSTRACT

A powdery composition based on silica for ceramic welding, in particular by projection, comprising
from 10 to 90% of a phase of siliceous particles comprise at least 80% by weight of cristobalite and at most 15% by weight of tridymite, based on the total weight of the composition,
from 90 to 10% by weight of conventional additives forming a binding phase, based on the total weight of the composition,
said siliceous particles having a $d_{50}$ comprised between 350 and 800 µm, preferably between 400 and 500 µm.

14 Claims, No Drawings

SILICEOUS COMPOSITION AND METHOD FOR OBTAINING SAME

The present invention relates to a powdery composition based on silica for ceramic welding, in particular by projection, and to its method for obtaining it.

Such compositions are well known from the state of the art, see for example document WO92/19566 or further GB 2,170,191 or U.S. Pat. No. 2,599,236.

Nowadays, such powdery compositions based on silica for ceramic welding type projection are rather prepared from refractory grains in transformed silica (cristobalite and/or tridymite), from combustible particles (Si, Al) and additional elements. The refractory grains in transformed silica with a well-defined grain size are obtained from a treatment by milling or screening of refractory parts, such as for example bricks, most often stemming from declassification by the producer of refractories.

Unfortunately, such a treatment generates the formation of fine particles in a large proportion, which are and should be discarded, which leads to an overall yield of the order of 50 to 60% for the desired grain size range. The fines then have to be treated, which represents a significant cost (putting them in a landfill, agglomeration).

Further, the availability of such a material is dependent on the existing stock and/or on the declassified fraction in the normal production of refractory parts in silica.

Finally, the powdery composition obtained after milling and grain size cut-off of these refractory parts, in particular declassified parts, is a function of the composition of these refractory parts. Typically, the refractory parts, obtained from $SiO_2$ are subject to baking which has the purpose of transforming in majority the quartz variety silica into silica consisting of cristobalite, tridymite and residual quartz. Within the scope of refractory parts, this residual quartz content is of minor importance since the quartz of the silica of refractory parts continues its transformation into cristobalite over time, in situ, after having positioned them. For example, when such refractory parts are used for a furnace wall, during the operation of the oven, the silica ends its baking until about 100% of silica transformed into the cristobalite and/or tridymite form are obtained, their ratio depending on the operating temperature.

During repair of refractory walls in silica by projection of a powdery mixture, the use of a composition with variable cristobalite/tridymite content remains more of a problem since it does not allow reproducibility of the characteristics of the weld on the one hand and a use for all potential applications on the other hand, such as for example in the case of glassware. The object of the invention is to overcome the drawbacks of the state of the art by providing a method allowing reliable reduction in the level of produced fines and breaking the dependency on the fraction of declassified refractory parts while providing a large range of applications as well as a stability of the characteristics of the ceramic weld.

In order to solve this problem, a composition is provided according to the invention, as indicated initially, comprising:

a) from 10 to 90% of a phase of siliceous particles comprising at least 80% by weight of cristobalite and at most 20% by weight of tridymite, preferably at most 17% by weight of tridymite, based on the total weight of the composition, b) from 90 to 10% by weight of conventional additives forming a binding phase, based on the total weight of said composition, said siliceous particles having an average particle size by sifting $d_{50}$ comprised between 350 and 800 μm, preferably between 400 and 500 μm.

The notation $d_X$ represents an average particle diameter by sifting, expressed in μm, relatively to which X % of the measured particles or grains are smaller.

As this may be ascertained, the composition according to present invention before projection has an already high cristobalite content as well as an adequate grain size for good projection conditions. Accordingly, when cracks are repaired by means of such a composition, the conversion of the residual tridymite occurs in situ and the weld rapidly attains an almost total conversion into cristobalite.

Advantageously, in the composition according to the present invention, said siliceous particles have a $d_{3\ max}$ of 1,100 μm, preferably 1,000 μm.

The notation $d_{X\ max}$ represents a maximum particle diameter obtained by sifting, expressed in μm, relatively to which X % of the measured particles or grains are smaller.

In a particular embodiment, in the composition according to the present invention, said siliceous particles have a $d_{3\ min}$ of 150 μm, preferably 200 μm, which leads to a composition wherein the content of fine particles is very limited, without however having to set aside a significant fine fraction, which significantly reduces the environmental impact and the cost for treating these fines.

The notation $d_{X\ min}$ represents a minimum particle diameter obtained by sifting, expressed in μm, relatively to which X % of the measured particles or grains are smaller.

Preferably, in the composition according to present invention, said siliceous particles have an $SiO_2$ content greater than or equal to 97%, preferably greater than or equal to 98%, more preferentially greater than or equal to 99% by weight, based on the total weight of siliceous particles.

Thus, the purity of said siliceous particles is very high, improving the quality of the obtained refractory, in particular by ceramic welding.

Advantageously, according to the present invention, the composition comprises from 20 to 85% by weight of a phase of siliceous particles and from 80 to 15% by weight of binding phase, based on the total weight of the composition.

Preferentially, the composition according to the present invention comprises from 50 to 85% by weight of a phase of siliceous particles and from 50 to 15% by weight of a binding phase, based on the total weight of the composition.

More particularly, said binding phase of the composition according to the present invention comprises at least one of the following elements or compounds: Al, Si, Mg, Ca, Fe, Cr, Zr, oxides $Al_2O_3$, $SiO_2$, MgO, CaO, $Fe_2O_3$, $Cr_2O_3$, $ZrO_2$, BaO, SrO, peroxides $CaO_2$, $MgO_2$, $BaO_2$, $SrO_2$.

In a preferred embodiment of the composition according to the invention, said binding phase comprises at least one of the elements or compounds selected from the group consisting of CaO, MgO, xCaO.yMgO wherein x and y represent mass fractions for which x+y≤100, and comprises at least MgO, optionally from the mixed oxide xCaO.yMgO wherein x and y represent mass fractions for which x+y≤100.

Other embodiments of the composition according to the invention are indicated in the appended claims.

The object of the invention is also a method for preparing a powdery composition based on silica for ceramic welding, in particular by projection.

Methods for manufacturing cristobalite with a heat treatment of quartz are also known.

For example, the method according to FR1008888 or GB 686,876 consist of melting (at 1,700° C.) very pure siliceous sand (99.8% by weight of silica), in the presence of a catalytic amount of an alkaline or earth alkaline metal oxide. Document FR1008888 moreover emphasizes that this amount depends on the oxide but has to be sufficiently notable so that the melted sand mass crystallizes into cristobalite upon its cooling. This oxide plays the role of a devitrification catalyst.

The methods described in both of these documents give the possibility of avoiding milling and therefore sorting of the raw material and of the obtained refractory product. In fact, the obtained mass of refractory product is friable, is easily crushed and transformed into a fine powder, which then has to be sifted in order to retain the desired grain size range, which has the result of a random yield.

Document FR1005233 relates to an improved version of the method of FR1008888 in which the quartz silica is sifted beforehand, to a size as small as possible (a sieve of 100 mesh ≤150 μm) and then sprayed with a soda or alkaline or earth alkaline salt solution in a catalytic concentration (1% by weight).

Unfortunately, such a method again resorts to the use of catalysts and only remains applicable to small size quartz particles.

Document GB 485,871 relates to a refractory composition and focuses on the suppression or minimization of the change in volume of the material inherent to the process for transforming quartz into transformed varieties for a refractory material, thus allowing operation at a lower temperature.

Unfortunately, this document again resorts to the use of grain growth agents consisting of salts of alkaline or earth-alkaline metals, in particular a halide of these metals for pre-transforming the quartz raw material into tridymite and/or into cristobalite. The latter is then added with a binding agent for shaping and baking refractory products under better conditions.

Documents EP 283 933 and EP 451 818 relate to a method for manufacturing agglomerated silica of the cristobalite type. According to document EP 283 933, the method comprises 1) a step for adding at least one compound of an alkaline metal (from 5 to 500 ppm) to very fine amorphous silica (micron size, BET surface area=50 m$^2$/g);

2) treatment at a temperature comprised between 1,000 and 1,300° C., preferably between 1,200 and 1,300° C., in order to at least partly transform the silica into cristobalite; and 3) a step for removing the alkaline metal by heating the material to temperatures above 1,300° C. in order to form an agglomerated refractory mass comprising cristobalite, which may easily be fractionated into powder.

According to document EP 451 818, the method, an alternative to the one disclosed in EP 283 933, is a method in which the amorphous silica is transformed into cristobalite without using alkaline metals but rather in the presence of cristobalite (of at least 5% by weight) at a temperature comprised between 1,400 and 1,700° C., this cristobalite being elaborated in a first step with the method described in EP 283 933.

The method according to the present invention is characterized in that it comprises the steps:

a) preparing a phase of siliceous particles comprising at least 80% by weight of cristobalite and at least 20% by weight, in particular at most 17% by weight, of tridymite, based on the total weight of the phase of siliceous particles;

b) mixing said phase of siliceous particles with one or more conventional additives forming a binding phase for the ceramic welding, said step for preparing said phase of siliceous particles comprising a supply of quarry quartz sand particles having an average particle size obtained by sifting, $d_{50}$, comprised between 350 and 800 μm, preferably between 400 and 500 μm, in a rotary furnace attaining a temperature comprised between 1,400° C. and 1,500° C. in an area called the hottest area and baking for a predetermined period of time and obtaining said phase of siliceous particles.

In the method according to the present invention, the quartz sand particles are selected for their great purity and their particular grain size which gives the possibility of obtaining the phase of siliceous particles with the desired final grain size, without having to necessarily pass through milling and grain size cut-off steps which have a quite substantial environmental impact, whether this is by the required milling energy or by the generation of fine particles to be disposed of.

Further, it appeared in a relatively surprising way that the quartz sand particles from a selected quarry retain their grain size after baking, without giving rise to fine particles to be subsequently treated and may be used, as such in the powdery mixture for subsequent applications, in particular ceramic welding. Further, the cristobalite conversion yield is improved, also by the particular selection of the quality and of the grain size of the quarry quartz sand particles.

Accordingly, the method according to the present invention has multiple advantages: it gives the possibility of breaking dependency on the supply of the declassified fraction of the refractory parts and of maintaining the quality of the siliceous particles, after selecting the quarry quartz sand deposit on the one hand and, it gives the possibility of obtaining a very high yield of the transformation of the quartz into cristobalite, while preserving the desired grain size and by only generating very small losses of materials on the other hand. Further, it ensures great reproducibility of the characteristics of the transformed sand and a fortiori of the mixture for ceramic welding. Finally, it improves the performances and the reliability of the material obtained by ceramic welding. Indeed, during projection by ceramic welding, it is important to control the grain size distribution of the powdery mixture, since it has an influence on the mass flow rate of said projected mixture towards the refractory wall to be repaired.

This has a great importance for guaranteeing reproducible kinetic energy to the particles which impact the refractory wall. This kinetic energy of the particles may for example be characterized and adjusted by acoustic measurements conducted during the transport of the (propellant gas-powdery composition) mixture for ceramic welding in order to avoid segregation problems of said powdery composition during its pneumatic transport (pipe+spray gun) and a fortiori during its travel towards the refractory wall to be repaired. Optical characterization at the outlet of the gun with a high speed obturation camera is an additional means.

Advantageously, said quarry quartz sand particles have a $d_{5\ min}$ of 150 μm, preferably 200 μm, giving the possibility from the start, by selecting the grain size fraction of the quarry quartz sand particles, of limiting the level of fines entering the method.

Preferably, said quarry quartz sand particles have before baking, a $SiO_2$ content greater than or equal to 97%, preferably greater than or equal to 98%, more preferentially greater than or equal to 99% by weight, based on the total weight of quarry quartz sand particles, the quarry quartz sand particles being further selected for their great purity.

Advantageously, in the method according to the present invention, the area said to be the hottest has a temperature greater than or equal to 1,430° C., more preferentially greater than or equal to 1,450° C. This gives the possibility of promoting the cristobalite phase, which is stable from 1,450° C. to the detriment of tridymite.

Advantageously, said siliceous particles have a $d_{3\ max}$ of 1,100 µm, preferably 1,000 µm. Indeed, after baking, there is no observed sintering or agglomeration. The particles have the generally desired grain size for projection, i.e. quasi-absence of particles having a particle size greater than 1,000 µm.

In a similarly advantageous way, said siliceous particles have a $d_{3\ min}$ of 150 µm, preferably 200 µm. The siliceous particles (therefore after baking) typically contain no or very few fine particles to be subsequently disposed of.

In a preferential embodiment, said siliceous particles have a $SiO_2$ content greater than or equal to 97%, preferably greater than or equal to 98%, more preferentially greater than or equal to 99% by weight, based on the total weight of siliceous particles, which represents very high purity allowing a large panel of applications.

In a particularly preferential embodiment, said phase of siliceous particles comprises at least 80% by weight of cristobalite and at most 15% by weight of tridymite, based on the total weight of the composition of the siliceous phase. In these siliceous particles, the cristobalite content is moreover advantageously greater than 96%, preferably greater than 97%, more preferentially greater than 98% and even more advantageously, greater than or equal to 99% by weight, based on the total weight of siliceous particles.

Advantageously, in the method according to the present invention, during said mixing step, from 20 to 85% by weight of phase of siliceous particles and from 80 to 15% by weight of binding phase, based on the total weight of the composition are brought into a mixing tank.

Preferentially, in the method according to the invention, during said mixing step, from 50 to 85% by weight of phase of siliceous particles and from 50 to 15% by weight of binding phase, based on the total weight of the composition, are brought into a mixing tank.

In an advantageous embodiment of the method according to the present invention, said binding phase comprises at least one of the following elements or compounds: Al, Si, Mg, Ca, Fe, Cr, Zr, oxides $Al_2O_3$, $SiO_2$, MgO, CaO, $Fe_2O_3$, $Cr_2O_3$, $ZrO_2$, BaO, SrO, peroxides $CaO_2$, $MgO_2$, $BaO_2$, $SrO_2$.

In another preferred embodiment of the method according to the present invention, said binding phase comprises at least one of the elements or compounds selected from the group consisting of CaO, MgO, xCaO.yMgO wherein x and y represent mass fractions for which x+y≤100, and preferably comprises at least MgO, optionally from the mixed oxide xCaO.yMgO wherein x and y represent mass fractions for which x+y≤100.

Other embodiments of the method according to the invention are indicated in the appended claims.

Other features, details and advantages of the invention will become apparent from the description given hereafter, not as a limitation and with reference to the Examples.

EXAMPLE 1

A quarry quartz sand is selected for its chemical purity ($SiO_2$>99%) and its grain size suitable for its application in a mixture for ceramic welding (>1,000 µm <5%: $d_{50}$ between 400 and 600 µm and <200 µm <5%).

It is introduced as a continuous supply into an industrial rotary furnace reaching 1,500° C. in its hottest area, where it dwells for 2 to 3 hours. After cooling, it is analyzed in terms of mineralogy (XR diffraction) and of grain size (by sifting).

Results (on an Average Sample Resulting from Several Sample Takings)

Mineralogy: cristobalite=89%; tridymite=10%; residual quartz=1%; Grain size: >1,000 µm=1-2%; $d_{50}$=400-500 µm; <200 µm=1-3%

The transformation of the quartz is therefore actually complete (residual Q=1%); it leads to a product consisting in a large majority of cristobalite with a minor content of tridymite (=10%); its grain size after transformation is practically similar to that before heat treatment, without significant generation of fines to be discarded.

After addition to this silica transformed by the method, of other ingredients which complete the mixture for ceramic welding (15% of silicon metal as a powder+3% of quicklime), a ceramic welding test in a pilot furnace is conducted; the obtained ceramic mass is characterized: apparent density=2.2 g/cm³; open porosity=6 vol %; mechanical compressive strength (crushing of a cylinder)=80 MPa. These characteristics are much greater than those of a conventional silica brick (porosity=18-22 vol %; compressive strength=30-40 MPa).

Further, unexpectedly, the thereby obtained mass by ceramic welding has a clearly lower thermal expansion (ΔL/L=linear 0.6% at 1,000° C.) relatively to that of a conventional silica brick (ΔL/L=linear 1.2% at 1,000° C.). Indeed, the mineralogical analysis revealed a strong proportion of glassy silica (amorphous fraction=60%) and a reduced cristobalite content (cristobalite=15%).

This lowering of the thermal expansion coefficient gives this ceramic mass better resistance to thermal shocks, for example useful in an area close to the door of a coke furnace chamber.

A re-baking step at a high temperature (5 days at 1,200° C.) allowed recrystallization of this amorphous cristobalite fraction, which reinforces the strength at a high temperature and is favorable for a long operating lifetime. Indeed, under the effect of this re-baking, the measured values by collapse under load (refractoriness under load) pass from T0.5=1,490 to T0.5=1,530° C.

EXAMPLE 2

The effect of a reduction in the cristobalite content from the method is illustrated by producing the following mixture: ¾ of silica transformed into cristobalite from the method and ¼ of transformed silica from re-milled bricks, the other ingredients (Si+CaO) being such as in Example 1.

The ceramic mass obtained by ceramic welding has a higher thermal expansion (ΔL/L=linear 1.0% at 1,000° C.), close to that of a conventional silica brick (ΔL/L=linear 1.2% at 1,000° C.). This is due to the amorphous fraction content which only attains 30% instead of 60% (Example 1), the cristobalite content increasing again from 15 to 45%.

Like in Example 1, the re-baking step (5 days at 1,200° C.) allowed complete recrystallization (zero amorphous fraction and cristobalite content increased again to 65%), which reinforces the high temperature strength.

EXAMPLE 3

From the same preparation of thermally transformed silica into cristobalite, a mixture was made for ceramic welding, in which quicklime CaO was replaced with magnesia MgO. The thereby obtained ceramic mass by ceramic welding was characterized: its thermal expansion became extremely low ($\Delta L/L$=linear 0.05% at 1,000° C.) by an increase in its amorphous fraction content (70%), as revealed by mineralogical analysis.

This quasi-zero thermal expansion gives the thereby obtained ceramic mass excellent resistance to thermal shocks.

Like in Examples 1 and 2, a re-baking step for 5 days at 1,200° C. confirmed that this amorphous fraction is able to recrystallize into cristobalite, if the operating temperature exceeds 1,100° C., which is the case in the center of a coke furnace chamber.

EXAMPLE 4

As in Example 2, the silica thermally transformed by the method may also be used as a mixture with silica from a conventional milling-sifting operation on refractory silica bricks (cristobalite+tridymite).

For this purpose, the mixture for ceramic welding this time consists of ¾ of transformed silica from the method and of ¼ of re-milled silica, the other ingredients (Si and MgO) being as in Example 3.

The ceramic mass obtained by ceramic welding has the characteristics mentioned in the table.

TABLE

| Characteristics | After projection | After re-baking (1200° C./5 d) |
|---|---|---|
| Apparent density (g/cm³) (measured according to the EN993-1 standard) | 2.17 | 2.22 |
| Open porosity (vol %) (measured according to the EN993-1 standard) | 5 | 6 |
| Cold crushing strength (MPa) (measured according to the EN993-5 standard) | 100 | 150 |
| Abrasion resistance (projection of SiC according to the ASTM C704 standard) - volume loss (cm³) | −11 | −9 |
| Expansion at 1,000° C. $\Delta L/L$ (lin %) | +0.2 | +1.2 |
| Collapse under load T0.5 (° C.) (measured according to the ISO1893 standard) | 1450 | 1610 |
| Mineralogy (main phases) | | |
| Cristobalite | 15 | 55 |
| Tridymite | 5 | 15 |
| Amorphous phase | 60 | 0 |

Relatively to Example 2 (passing from CaO to MgO), the lowering of the thermal expansion (from linear 1.0 to 0.2% at 1,000° C.), favorable to resistance to thermal shocks, should be emphasized. This is due to the high amorphous phase content (60%).

By recrystallization by re-baking, reinforcement of the thermal and mechanical characteristics is observed, which should be expressed by an extension of the operating lifetime, for example in a coke furnace.

It is quite understood that the present invention is by no means limited to the embodiments described above and that many modifications may be made thereto without departing from the scope of the appended claims.

The invention claimed is:

1. A method for preparing a powdery composition based on silica for ceramic welding, comprising the steps:
    (a) preparing a phase of siliceous particles comprising at least 80% by weight of cristobalite and at most 20% by weight of tridymite, based on the total weight of the phase of siliceous particles; and
    (b) mixing said phase of siliceous particles with one or more additives forming a binding phase in ceramic welding,
    said step for preparing said phase of siliceous particles comprising a supply of quarry quartz sand particles having a $d_{50}$ comprising between 350 and 800 μm in a rotary furnace attaining 1,400° C. to 1,500° C. in an area called the hottest area and for baking for a predetermined period of time with said phase of siliceous particles being obtained.

2. The preparation method according to claim 1, wherein said quarry quartz sand particles have a $d_{5\,max}$ of 1,100 μm.

3. The preparation method according to claim 1, wherein said quarry quartz sand particles have a $d_{5\,min}$ of 150 μm.

4. The preparation method according to claim 1, wherein said quarry quartz sand particles have before baking an $SiO_2$ content greater than or equal to 97 by weight, based on the total weight of quarry quartz sand particles.

5. The preparation method according to claim 1, wherein the area called the hottest area has a temperature greater than or equal to 1,430° C.

6. The preparation method according to claim 1, wherein said siliceous particles have a $d_{3\,max}$ of 1,100 μm.

7. The preparation method according to claim 1, wherein said siliceous particles have a $d_{3\,min}$ of 150 μm.

8. The preparation method according to claim 1, wherein said siliceous particles have an $SiO_2$ content greater than or equal to 97% by weight, based on the total weight of siliceous particles.

9. The preparation method according to claim 1, wherein said phase of siliceous particles comprises at least 80% by weight of cristobalite and at most 15% by weight of tridymite, based on the total weight of siliceous particles.

10. The preparation method according claim 1, wherein, during said mixing step, 20 to 85% by weight of phase of siliceous particles and 80 to 15% by weight of binding phase, based on the total weight of the composition, are brought into a mixing tank.

11. The preparation method according to claim 1, wherein, during said mixing step, 50 to 85% by weight of phase of siliceous particles and 50 to 15% by weight of binding phase, based on the total weight of the composition, are brought into a mixing tank.

12. The preparation method according to claim 1, wherein said binding phase comprises at least one of the following elements or compounds: Al, Si, Mg, Ca, Fe, Cr, Zr, $Al_2O_3$, $SiO_2$, MgO, CaO, $Fe_2O_3$, $Cr_2O_3$, $ZrO_2$, $CaO_2$, $MgO_2$, $BaO_2$, and $SrO_2$.

13. The preparation method according to claim 12, wherein said binding phase comprises at least one of the elements or compounds selected from the group consisting of CaO, MgO, and xCaO.yMgO, wherein the x and y represent mass fractions for which x+y<100.

14. The preparation method according to claim 12, wherein said binding phase comprises at least MgO.

* * * * *